United States Patent [19]

Marchman

[11] Patent Number: 5,395,741
[45] Date of Patent: Mar. 7, 1995

[54] METHOD OF MAKING FIBER PROBE DEVICES USING PATTERNED REACTIVE ION ETCHING

[75] Inventor: Herschel M. Marchman, New Providence, N.J.

[73] Assignee: AT&T Corp., Murray Hill, N.J.

[21] Appl. No.: 173,292

[22] Filed: Dec. 22, 1993

[51] Int. Cl.[6] .............................................. C03C 25/06
[52] U.S. Cl. .................... 430/320; 430/321; 385/123; 385/902; 156/643; 156/650; 156/659.1
[58] Field of Search ................ 430/321, 320; 385/123, 385/902; 250/216, 234; 156/643, 650, 659.1

[56] References Cited

U.S. PATENT DOCUMENTS

| | | | |
|---|---|---|---|
| 3,883,353 | 5/1975 | Cohen et al. | 430/321 |
| 4,469,554 | 9/1984 | Turner | 159/657 |
| 4,604,520 | 8/1986 | Pohl | 250/216 |
| 5,018,865 | 5/1991 | Ferrell et al. | 356/376 |
| 5,105,305 | 4/1992 | Betzig et al. | 359/368 |
| 5,168,538 | 12/1992 | Gillespie | 385/123 |
| 5,272,330 | 12/1993 | Betzig et al. | 250/216 |

OTHER PUBLICATIONS

H. Kumar Wickramasinghe, "Scanned-Probe Microscopes," *Scientific American*, vol. 261, No. 4, pp. 98-105 (Oct. 1989).

G. Binnig et al., "Atomic Force Microscope," *Phys. Rev. Lett.*, vol. 56, No. 9, Mar. 3, 1986, pp. 930-933.

Pangaribuan, T. et al., "Reproducible Fabrication Technique of Nanometric Tip Diameter Fiber Probe For Photon Scanning Tunneling Microscope," *Japan Journal Applied Physics*, vol. 31 (1992), pp. L 1302-L 1304, Part 2, No. 9A, 1 Sep. 1992.

*Primary Examiner*—Charles L. Bowers, Jr.
*Assistant Examiner*—John A. McPherson
*Attorney, Agent, or Firm*—David I. Caplan

[57] ABSTRACT

A fiber probe is formed from a cladded optical fiber segment by isotropically etching a lower portion of the fiber segment, followed by cleaving the resulting etched lower portion. The resulting cleaved endface of the fiber segment is then coated with a protective layer which is then patterned by exposure to optical radiation propagating down the core of the fiber segment followed by development. A plasma etching, masked by the thus patterned protective layer, removes a desired height of cladding in the neighborhood of the cleaved endface. Finally, the lower regions of the fiber segment are subjected to a further etching to reduce the width of the tip to a desired value.

19 Claims, 3 Drawing Sheets

METHOD OF MAKING FIBER PROBE DEVICES USING PATTERNED REACTIVE ION ETCHING

TECHNICAL FIELD

This invention relates to probe devices, and more particularly to metrological fiber probe devices and to methods of making them.

BACKGROUND OF THE INVENTION

More than 100 years ago, the famous physicist Ernst Abbe described a fundamental limitation of any microscope that relies on any lens or system of lenses in an imaging system to focus light or other radiation: diffraction obscures (maes fuzzy) those details of the image that are smaller in size than approximately one-half the wavelength of the radiation. See "Scanned-Probe Microscopes" by H. Kumar Wickramasinghe, published in *Scientific American*, Vol. 261, No. 4, pp. 98–105 (October 1989). In other words, the resolution of the microscope is limited by the wavelength of the radiation. In order to circumvent this limitation, researchers have investigated the use of, *inter alia*, various types of imaging probes. Scanning tunneling microscopy (hereinafter "STM") devices, atomic force microscopy (hereinafter "AFM") devices, and near-field scanning optical microscopy (hereinafter "NSOM") are some examples of different types of probe microscopes.

In STM, a metallic probe is brought sufficiently close to a conducting sample surface such that a small tunneling current is established. The magnitude of this current is extremely dependent on the tip-to-sample distance (i.e., topography of the sample surface). The tip is allowed to scan laterally across the (irregular) surface of the sample body with several angstroms separation between tip and sample in order to achieve imaging with atomic-scale resolution. The tunneling current, and hence the tip-to-sample separation, is detected and controlled by an electromechanical feedback servo-mechanism. In AFM, imaging is achieved in a similar manner to that of the STM except that the atomic forces (either short-range repulsive or long-range attractive) are detected instead of tunneling current. An obvious advantage to this technique is that the tip and sample do not have to be conductive, all materials exert atomic forces.

An NSOM device is typically comprised of an aperture located at the tip of an elongated optical probe, the aperture having a (largest dimension that is smaller than approximately the wavelength of the optical radiation that is being used. During device operation, the probe is positioned in close proximity to the surface of a sample body. The aperture of the probe is then allowed to scan across the surface of the sample body at distances of separation therefrom all of which distances are characterized by mutually equal forces components exerted on the probe device in the direction perpendicular to the global (overall) surface of the sample body, the scanning being detected and controlled by an electromechanical feedback servomechanism as was the case in STM and AFM.

For example, U.S. Pat. No. 4,604,520, describes, *inter alia*, a probe device having an aperture located at the tip of a cladder glass fiber that has been coated with a metallic layer. The aperture is drilled into the metallic layer at the tip of the fiber at a location that is coaxed with the fiber. The (immediate) neighborhood of the tip is composed of a section of solid glass fiber that has obliquely sloping (truncated conical) sidewalls, whereby the sidewalls do not form a cylinder of any kind. Therefore, as the probe device laterally scans a rough surface, the calculations required to determine the desired information on the actual contours (actual profile) of the surface of the sample body require prior detailed knowledge of the slanting contours of the sidewalls of the probe, and these calculations typically do not yield accurate metrological determinations of the desired profile of the contours of the surface of the sample body, especially at locations of the surface of the sample body where sudden jumps (vertical jumps) thereof are located. In addition, fabrication of the probe device is complex and expensive, especially because of the need for drilling the aperture coaxially with the fiber.

Another example involves the fabrication of nanometric tip diameter fiber probes for photon tunneling microscopes ("PSTM") by selective chemical etching of the $GeO_2$-doped cores of optical fibers. See "Reproducible Fabrication Technique of Nanometric Tip Diameter Fiber Probe for Photon Scanning Tunneling Microscope", Togar Pangaribuan, el. at., *Japan Journal Applied Physics*, Vol. 31 (1992), pp. L 1302-L 1304. By selectively etching the $GeO_2$cioped regions of the fiber, a tapered tip having the shape of a small cone can be formed on the endface of the optical fiber. The cone angle of the fiber probe tip is controlled by varying the doping ratio of the fiber core and the composition of the etching solution. A fiber probe with a cone angle of 20° and tip diameter of less than 10 nm was fabricated. Only probes having conical-shaped endfaces can be made with this technique, so that the sidewalls do not form a cylinder of any kind. The scanning range of such a probe is undesirably limited owing to the relatively large width (diameter) of the endface on which the relatively short-width conical tip is centered, coupled with the fact that, during scanning, the probe is rastered from side-to-side in an arc: a desired large length of scan is attempted, the corners of the probe's endface undesirably will make contact with the sample surface. In addition, the conical shape of the tip undesirably limits the accuracy of measurements wherever the surface being probed has a sudden jump.

SUMMARY OF THE INVENTION

This invention involves a method of making fiber probe device including the steps of (*a*) providing a fiber segment having an inner (central) cylindrical core region and an outer (advantageously cylindrical) region, the inner region having a waveguiding property that confines the optical radiation of step (*e*) sufficiently to define the patterned photoresist layer of step (*f*);

(*b*) etching a lower portion of the fiber segment for a first predetermined amount of time, whereby a thinner lower cylindrical region of the fiber segment remains;

(*c*) cleaving the thinner lower cylindrical region of the fiber segment, whereby a cleaved thinner lower cylindrical region of the fiber, having a cleaved endface, is formed;

(*d*) coating the cleaved endface with a protective photoresist layer;

(*e*) coupling optical radiation into the core region of the fiber segment, whereby the radiation propagates through the core region and is incident on the portion of the protective photoresist layer that coats the entire surface of the cleaved endface;

(f) developing the protective photoresist layer, whereby the photoresist layer becomes a patterned photoresist masking layer that coats the core region located at the cleaved endface;

(g) anisotropically dry etching the cleaved endface for a second predetermined amount of time, whereby a predetermined height of material of the cladding region contiguous with the cleaved endface is removed while the height of at least a portion of the core region located at the cleaved endface is not changed; and (h) essentially isotropically etching at least the cleaved thinner lower core region of the fiber segment for a third predetermined amount of time, whereby a tip region having a predetermined maximum width is formed located at cleaved thinner lower cylindrical region.

The invention also involves a metrological method including the steps of making the fiber probe device in accordance with the above steps (a) through (h) followed by moving the probe device across a surface of a sample body. For NSOM, the sidewalls of the tip core region is advantageously coated with an optically reflecting layer such as a metallic layer like chromium.

As used herein, the term "anisotropic etching" refers to unequal etching rates in the radial and axial directions, and more specifically in this case it refers to etching in which the etching rate is higher in the axial than in the radial direction such that the ratio of the etching rate in the axial direction to that in the radial direction is at least approximately 30, preferably at least approximately 50. Also, as used herein the term "essentially isotropically" etching refers to the cases in which the rates of etching in the axial and radial directions do not differ from each other by more than 10 per cent. And as used herein, the term "approximately" has its ordinary meaning in terms of significant figures (significant digits). Also, as used herein, the term "maximum width" refers to the maximum diameter-i.e., the length of the longest line segment that can be drawn in a cross section of a cylindrical region of a fiber segment, the line segment being oriented perpendicular to the axis of the cylinder, from one extremity of the cross section to another. In the case of a circular cylindrical region, the width (=diameter) in any direction of each cross section is thus equal to this maximum width.

The shape of the probe device in this invention, including the tip core region thereof, is thus formed by anisotropic etching and thus does not depend on cleaving the fiber. The anisotropic etching relies upon the photoresist patterning technique. Prior to final formation of the probe, the fiber endface area is thus reduced by isotropically etching the fiber. Decreasing the area of the fiber endface helps to prevent undesired contact between the sample surface and endface when the fiber is not normal to the sample plane.

This method of probe fabrication thus does not rely on the doping profile of the fiber and also not depend on the difference in etching rate of the core region relative to that of the cladding region. The cylindrical tip is formed by anisotropically etching the fiber in the axial direction to form a pedestal-shaped cylindrical (or nearly) region under the masking layer. A flat end face of the tip core region results from the cleaving and the resist or metal protective masking during the reactive ion anisotropic etching. Throughout the second wet isotropic etching, the lowest portion maintains its fight cylindrical shape, even as its dimensions (in all directions) decrease. Any structures created on the end face, such as a cone or point, are eliminated as the diameter becomes significantly smaller (at approximately 0.1 μm) than the doped core region (typically 3 μm to 5 μm).

Only for the sake of clarity, none of the FIGURES is drawn to any scale.

DETAILED DESCRIPTION

Figure 1:
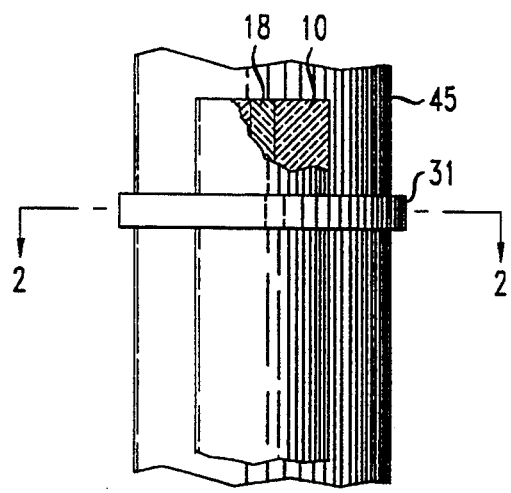
FIGS. 1 and 3–9 depict cross-sectional elevational views of a probe device with straight vertical (right-cylindrical) sidewalls being fabricated in accordance with a specific embodiment of the invention.
Figure 2:
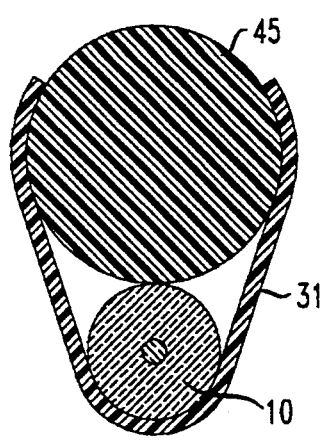
FIG. 2 depicts a cross-sectional horizontal view of the structure shown in FIG. 1.
Figure 3:
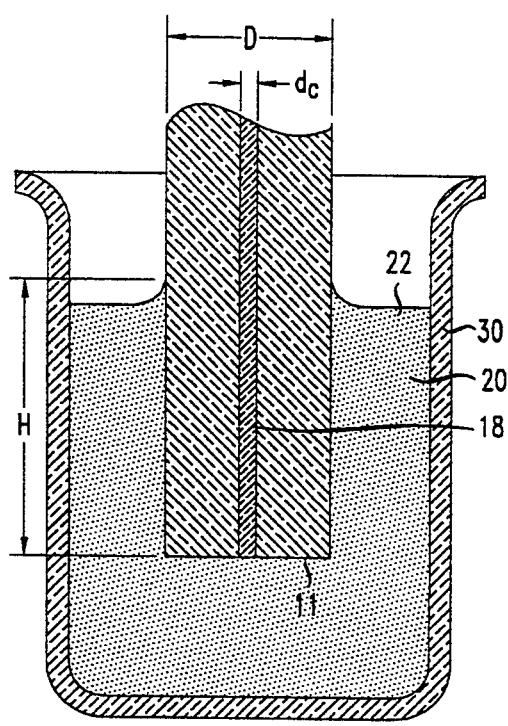

Referring to FIGS. 1, 2, and 3, an optical fiber segment 10, having a core region 18, typically is circularly symmetrical and takes the form of a solid circular cylinder of diameter D as known in the art of optical fibers. This segment 10 has a bottom endface 11 that is flat and is oriented in a plane perpendicular to the axis of the (cylindrical) segment 10. The diameter D (FIG. 3) of the fiber segment 10 i.e., of the "cladding" is typically equal to approximately 125 μm of more. The diameter of the core region 18 is typically in the approximate range of 3 μm to 5 μm, but can be in the approximate range of 1 μm to 50 μm. The fiber segment 10 is firmly attached to a holder 45, typically made of teflon, by means of a thin segment 31 of suitable material coated with an adhesive, such as a segment of adhesive tape.

The fiber segment 10 is immersed (FIGS. 3 and 4) in a wet essentially isotropic etching solution 20, typically a buffered oxide etching solution-such as a solution composed of 2 parts (7:1) buffered oxide etch, 1 part hydrofluoric acid, 1 part acetic acid, and 1 part $H_2O$. The acetic and $H_2O$ components help dissolve the accumulation of residuals on the fiber surface during etching.

The etching solution 20 is contained in a container 30, and it has a level 22 that intersects the fiber segment somewhere, whereby the entire (lower) portion of the surface of the fiber segment 10 that is submerged in the solution 20 is isotropically etched.

Figure 4:
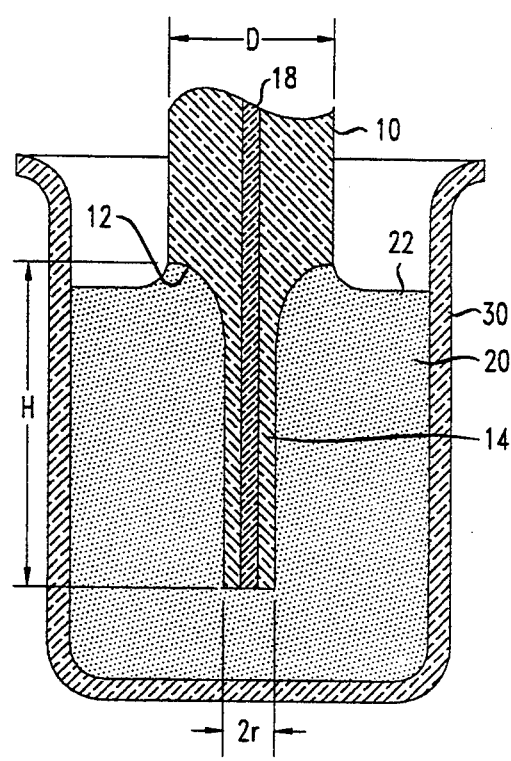

After the fiber segment 10 has thus been immersed for a prescribed amount of time, it assumes the shape shown in FIG. 4 that is, relatively a thick upper region 10, in the form of a solid right circular cylinder, terminating in a tapered intermediate region 12, in the form of a tapered solid circular region, terminating in a relatively thin lower cylindrical region 14, in the form of another solid right circular cylinder with diameter 2r.

For example, as indicated in FIGS. 3 and 4, the height (length) H of the lower region 14 of the fiber segment 10, which is submerged in the etching solution 20, becomes equal to typically approximately 2.5 cm. After having been etched with the solution 20, the thin lower region 14 has a diameter 2r (FIG. 4) typically equal to approximately 30 μm, as determined by the duration of the immersion. As used herein, the term "approximate" has its usual meaning in terms of significant figures.

Next, the bottom face of this lower region 14 is cleaved in a plane oriented perpendicular to the common axes of the upper region 10 and the lower region 14, as by means of a fiber cleaver aided by optical microscopic viewing or other micrometer controlled procedure. In this way, the height (length) of lower solid cylindrical region 16 is reduced to a value h, and the endface thereof is a planar surface oriented perpendicular to the (common) axis. This height h typically is in the approximate range of 0.05 μm to 50 μm, and advantageously in approximate range of 1 μm to 30 μm.

Figure 6:
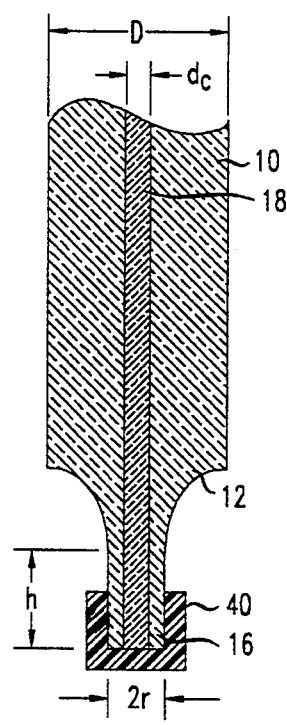
Figure 7:
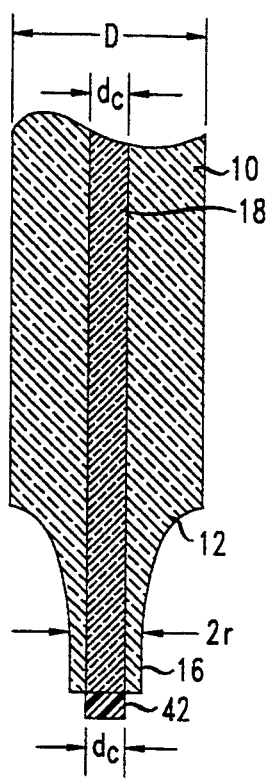

The bottom surfaces of the fiber segment are coated (FIG. 6) with either a negative or a positive photoresist layer 40. Ultraviolet light is then coupled into the top of the fiber segment, in order to expose the photoresist at the resulting light-emitting core region at the bottom endface. For a negative photoresist, after development a circular masking layer 42 of photoresist remains at the core (FIG. 7).

If the photoresist was positive (not shown), an opening (cleared area) in the photoresist is formed by the light at the core region after development. In that case a metal masking layer is formed on the cleaved area of the core endface, as by means of a known lift-off procedure.

Figure 8:
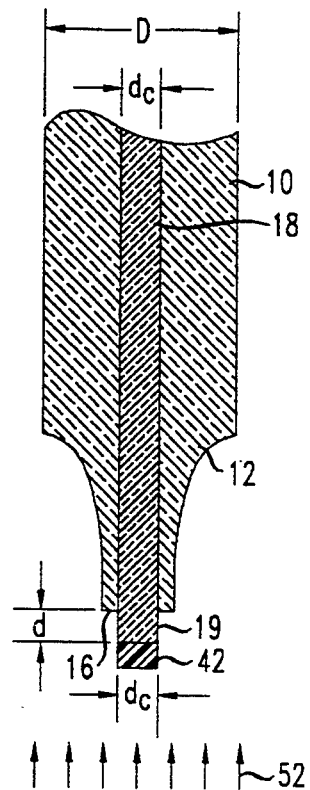

Next, the fiber segment is placed in a reactive ion etching chamber (FIG. 8) for an anisotropic etching with a plasma 52. Typically, the plasma 52 is obtained with an approximate 25 mT (=3.3 Pascal) pressure of $CF_4$ gas at approximately 250 W of power, in order to etch the fiber in the axial direction only. Other fluorine-based plasmas can be used to etch the fiber segment. Etching in the axial direction occurs over the entire endface 16 except at the core, which is protected by negative photoresist 42, or is protected by the metal layer (not shown). After a predetermined amount of anisotropic etching by the plasma, a cylindrical region of core material 18 having a height d and diameter $d_c$ remains underneath the photoresist or metal layer. In this way, the height d of the resulting pedestal region 19 located at the bottom of the fiber segment 10 thus can be controlled with submicrometer accuracy. This control of the thus etched (probe) height d (i.e., its aspect ratio), can provide desired stability of the probe when scanning and imaging a surface to be measured during operation of the fiber (FIG. 9) as a probe device.

Figure 9:
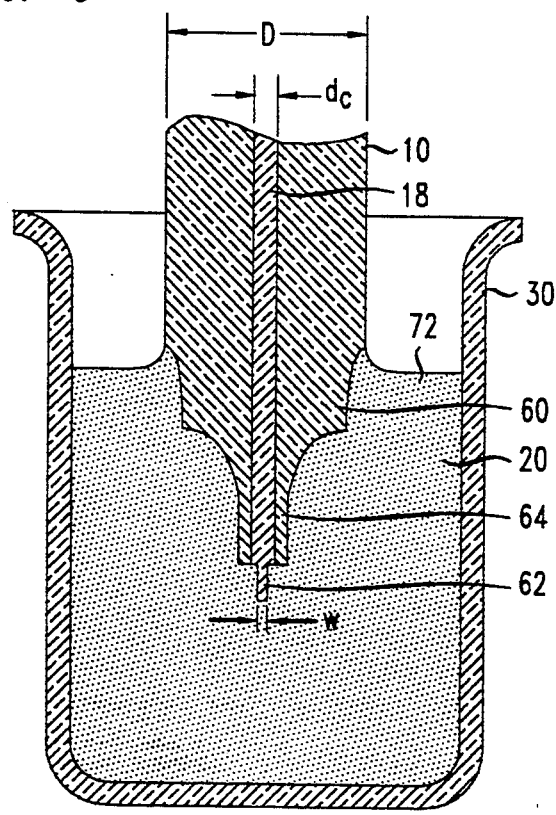

Next, the fiber is again immersed in the (essentially) isotropic etching solution 20. Typically the level 72 of the etching solution 20 is (but need not be) above the top of the tapered region 12. Essentially isotropic etching is continued until the lowest cylinder region 62 i.e., the tip region of the fiber has a width (diameter) w equal to the desired final probe tip width. Because the etching is isotropic, the shape (including the height d of the entire submerged portion of the, fiber remains unchanged so that the lowest cylinder region 62 is preserved as a solid right circular cylinder. At the same time, the diameters of the resulting solid cylindrical intermediate regions 64 and 60 of the fiber are also reduced. At the location of the level 72, a meniscus of the etching solution 20 produces an unimportant gradual tapered transition between regions of the fiber immediately above and immediately below the solution level 72, as indicated in FIG. 9.

The width w of the tip region 62 can be in the approximate range of 0.01 μm to 10 μm. By overexposing the photoresist layer 40, the width of the masking layer 42 can be made greater than the width $d_c$ of the core region 18. Thus the width w of the tip 62 can be made larger than that of the core region 18. Typically, however, the width w of the tip 62 is typically in the approximate range of 0.05 μm to 0.5 μm, and is advantageously in the approximate range of 0.05 μm to 0.2 μm depending on the ultimately desired metrological use of the probe when measuring sample surfaces, i.e., depending on the desired metrological resolution of the measurements to be made by the fiber during its subsequent use as a probe device. The height d of the tip region 62 is typically in the approximate range of 0.01 μm to 10 μm, advantageously in the approximate range of 0.1 μm to 5 μm.

In case the level 72 (FIG. 9) of the etching solution 20 falls below the top of the tapered intermediate region 12, there simply will be no intermediate region 60. During an initial phase of the etching (FIG. 9), the masking layer 42 falls off by itself, or it can be removed (as by dissolving it in a suitable solvent) prior to the immersion indicated in FIG. 9.

Figure 5:
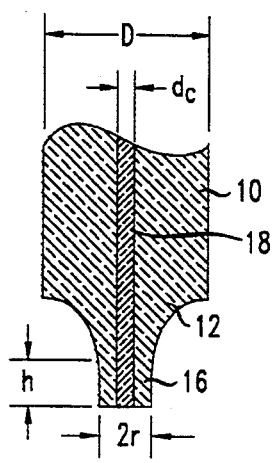

For large diameter probes, the formation of features on the end face is prevented by the cleaving step (FIG. 5) because not enough etching occurs in the axial direction to produce a significant variation in the amount (depth) of etching at different radii of the fiber, hence preventing the formation of a cone. If a large amount of etching in the axial direction is desired, a flat endface can still be achieved by using a fiber with uniform radial doping profile in the core region, or by adjusting the composition of the etching solution, or by doing both.

For use as an NSOM device, the sidewalls of the regions 62 and 64 advantageously are coated with an optically reflecting layer such as a metallic layer like chromium, or the fiber segment 10 has a core region as known in the art (whereby the cladding region reflects optical radiation during the NSOM use), or both.

The shape of the cross section of the fiber segment 10 can be other than circular—such as elliptical, rectangular, or square—as can be obtained by cutting a glass body into such a shape. In such a case, the cross section of each cylindrical region has a maximum and minimum width that differ from each other.

Prior to cleaving (FIG. 5), the fiber segment can be lifted upwards in the etching solution 20 (FIG. 4) by a vertical distance e, and its lowest portion can then be subjected to further etching for another predetermined time duration. In this way, an intermediate cylindrical region (not shown) is formed in the fiber segment, having a predetermined height e. Typically, this height e is in the approximate range of 4 μm to 2000 μm, and advantageously in the approximate range of 50 μm to 500 μm. In such a case, the height h of the lowest cylindrical region 16, as determined by the cleaving, is typically in the approximate range of 5 μm to 2100 μm, and advantageously in the approximate range of 55 μm to 550 μm. The width w of the tip region 62 is then made to be the same as described above.

Although the invention has been disclosed in detail in terms of a specific embodiment, various modifications can be made without departing from the scope of the invention. For example, instead of attaching the fiber segment to the holder 45 and assembling them as indicated in FIGS. 1 and 2, a protective polymer resist layer can coat the sidewalls of the upper portion of the fiber segment, while the top (horizontal) endface of the fiber segment is bonded to the holder 45 by means of an adhesive medium. In this way, a sharper meniscus is formed when the fiber segment is immersed for the first time (FIG. 3) in the etching solution, the protective resist layer being resistant to the etching. The protective resist layer is then removed, prior to forming the photoresist layer 40 (FIG. 6), at least from those areas of the sidewalls to be subjected to further etching.

Also, instead of optical fiber, the fiber 10 can be made of any material that can be etched as described above, that can be cleaved to form a (planar) endface, and that has a cylindrical inner (central) region with a waveguiding property to confine propagating optical radiation sufficiently to define the pattern of exposure of the photoresist layer 40 to the optical radiation.

If concave walls for the tip of the probe are desired, as for imaging undercuts in a sample surface being probed, a higher plasma pressure of approximately 100 mT (=13 Pascal) can be used to undercut the photoresist or the metal layer. In this way the vertical etching rate is higher in the axial than in the radial direction.

The two etchings indicated in FIGS. 3–4 and 9 can be chemically different or physically different (e.g. wet in FIGS. 3–4, dry in FIG. 9; or dry in FIGS. 3–4, wet in FIG. 9; or dry in both; at some sacrifice of fabrication speed). Any or all of the wet etchings can be enhanced by ultrasonic agitation. The etchings indicated in FIGS. 3–4 and FIG. 9 advantageously are both, but need not be, essentially isotropic.

Moreover, the fiber segment 10 can be lifted upward during the first wet etching (FIG. 3) and etched for another predetermined time interval, for the purpose of introducing an extra intermediate cylindrical region in the final probe (FIG. 9) located between the intermediate cylindrical region 64 and the tip region 62, as described in greater detail in copending patent application Ser. No. 08/173,285. This extra intermediate region can serve the purpose of adjusting the mechanical resonance characteristic of the fiber probe during operation (i.e., as it is moved laterally across a sample surface). In such a case the vertical length of this extra intermediate region is typically in the approximate range of 4 μm to 2,000 μm, and is advantageously in the approximate range of 50 μm to 500 μm; the height h (FIG. 5) prior to forming this extra intermediate region is then typically in the approximate range of 5 μm to 2,100 μm, and is advantageously in the approximate range of 55 μm to 550 μm; and the height d of the tip region 62 (FIG. 9) is the same as in the case where no such extra intermediate region is formed. In this way, the bottom of the polymer resist layer is used to define the height h. In this case, however, the polymer resist layer is advantageously removed (at least in regions that otherwise would come in contact with the etching solution) prior to the formation of the extra intermediate cylindrical region (if any is to be formed).

The fabrication techniques described above, can be performed in batch fabrication because the height of the tip region of the probe is defined by dry anisotropic etching and resist patterning rather than other techniques such as manual cleaving or ion beam milling. In addition, the fiber segment 10 can be made relatively long, in order to couple light in to the opposite end for NSOM or shearforce techniques for probing sample surfaces.

I claim:

1. A method of making a fiber probe device comprising the steps of:
    (a) providing a fiber segment having an inner cylindrical core region and an outer cladding region, the inner region having a waveguiding property that confines optical radiation recited in step (e) sufficiently to define a patterned photoresist layer recited in step (f);
    (b) etching a lower portion of the fiber segment for a first predetermined amount of time, whereby a thinner lower cylindrical region of the fiber segment remains;
    (c) cleaving the thinner lower cylindrical region of the fiber segment, whereby a cleaved thinner lower cylindrical region of the fiber, having a cleaved endface, is formed;
    (d) coating at least the entire surface of the cleaved endface with a protective photoresist layer;
    (e) coupling optical radiation into the core region of the fiber segment, whereby the optical radiation propagates through the core region and is incident on the portion of the protective photoresist layer that coats the core region of the fiber located at the cleaved endface;
    (f) developing the protective photoresist layer, whereby the photoresist layer becomes a patterned photoresist masking layer that coats the core region located at the cleaved endface;
    (g) anisotropically dry etching the cleaved endface for a second predetermined amount of time, whereby a predetermined height of material of the cladding region contiguous with the cleaved endface is removed while a height of at least a portion of the core region located at the cleaved endface is not changed; and
    (h) essentially isotropically etching at least the cleaved thinner lower core region of the fiber segment for a third predetermined amount of time, whereby a tip region having a predetermined maximum width is formed located at the cleaved thinner lower cylindrical region.

2. The method of claim 1 in which the etching of step (b) is wet etching.

3. The method of claim 1 in which the etching of step (h) is wet etching.

4. The method of claim 1 in which the predetermined maximum width is in the approximate range of 0.01 μm to 10 μm.

5. The method of claim 1 in which the predetermined maximum width is in the approximate range of 0.05 μm to 0.5 μm.

6. The method of claim 1 in which the predetermined maximum width is in the approximate range of 0.05 μm to 0.2 μm.

7. The method of claim 1 further including, between steps (b) and (c), the steps of further etching a lowest region of the fiber segment, the lowest region having a predetermined height that is less than that of the lower region.

8. The method of claim 7 in which the predetermined height of the lowest region is in the approximate range of 4 μm to 2,000 μm.

9. The method of claim 7 in which the predetermined height of the lowest region is in the approximate range of 50 μm to 500 μm.

10. The method of claim 7 in which the predetermined maximum width is in the approximate range of 0.01 μm to 10 μm.

11. The method of claim 7 in which the predetermined maximum width is in the approximate range of 0.05 μm to 0.5 μm.

12. The method of claim 7 in which the predetermined maximum width is in the approximate range of 0.05 μm to 0.2 m.

13. The method of claim 12 further including the step of coating the sidewalls of the tip region with an optically reflecting layer followed by moving the fiber segment across a surface of a sample body.

14. The method of claim 1 further including the step of coating the sidewalls of the tip region with an optically reflecting layer followed by moving the fiber segment across a surface of a sample body.

15. The method of claim 1 in which the tip region has a height in the approximate range of 0.01 μm to 10 μm.

16. The method of claim 15 followed by moving the fiber segment across a surface of a sample body.

17. The method of claim 1 in which the tip region has a height in the approximate range of 0.1 μm to 5 μm.

18. The method of claim 17 followed by moving the fiber segment across a surface of a sample body.

19. The method of claim 1, 2, 3, 4, 5, 6, 7, 8, 9, 10, 11, 12, or 15, followed by moving the fiber segment across a surface of a sample body.

* * * * *